United States Patent
Chamberlain et al.

(10) Patent No.: US 9,890,647 B2
(45) Date of Patent: Feb. 13, 2018

(54) COMPOSITE GAS TURBINE ENGINE COMPONENT

(75) Inventors: Adam Lee Chamberlain, Mooresville, IN (US); Ted Joseph Freeman, Avon, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 1394 days.

(21) Appl. No.: 12/847,608

(22) Filed: Jul. 30, 2010

(65) Prior Publication Data

US 2011/0158820 A1 Jun. 30, 2011

Related U.S. Application Data

(60) Provisional application No. 61/290,698, filed on Dec. 29, 2009.

(51) Int. Cl.
| | |
|---|---|
| *F01D 5/18* | (2006.01) |
| *F01D 5/28* | (2006.01) |
| *B23H 9/10* | (2006.01) |
| *B23H 9/14* | (2006.01) |
| *B24B 1/04* | (2006.01) |

(52) U.S. Cl.
CPC ........... *F01D 5/284* (2013.01); *B23H 9/10* (2013.01); *B23H 9/14* (2013.01); *B24B 1/04* (2013.01); *F01D 5/187* (2013.01); *F01D 5/186* (2013.01); *F01D 5/282* (2013.01); *F05D 2230/10* (2013.01); *F05D 2230/12* (2013.01); *F05D 2230/14* (2013.01); *F05D 2260/202* (2013.01); *F05D 2300/6033* (2013.01); *Y10T 29/49337* (2015.01)

(58) Field of Classification Search
CPC ... F01D 5/00; F01D 5/147; F01D 5/18; F01D 5/186; F01D 25/08; F01D 25/12
USPC .......................... 416/95, 96 R, 97 R, 241 B
See application file for complete search history.

(56) References Cited

U.S. PATENT DOCUMENTS

| | | |
|---|---|---|
| 4,164,102 A | 8/1979 | Lohrum et al. |
| 4,762,464 A | 8/1988 | Vertz et al. |
| 4,992,639 A * | 2/1991 | Watkins et al. ............. 219/69.2 |
| 5,043,553 A | 8/1991 | Corfe et al. |
| 5,637,239 A | 6/1997 | Adamski et al. |

(Continued)

FOREIGN PATENT DOCUMENTS

WO WO 02/49795 6/2007

OTHER PUBLICATIONS

Bogard (NPL "Airfoil Film Cooling"), published in "Gas Turbine Engine Handbook" in 2006.*

(Continued)

*Primary Examiner* — Justin Seabe
(74) *Attorney, Agent, or Firm* — Brinks Gilson & Lione

(57) ABSTRACT

One embodiment of the present invention is a unique composite gas turbine engine component. In one form, the composite component is an airfoil. Another embodiment is a unique method for manufacturing a composite gas turbine engine component. Other embodiments include apparatuses, systems, devices, hardware, methods, and combinations composite gas turbine engine components. Further embodiments, forms, features, aspects, benefits, and advantages of the present application shall become apparent from the description and figures provided herewith.

15 Claims, 4 Drawing Sheets

(56) References Cited

U.S. PATENT DOCUMENTS

| | | |
|---|---|---|
| 6,243,948 B1 | 6/2001 | Lee et al. |
| 6,368,060 B1 | 4/2002 | Fehrenbach et al. |
| 6,441,341 B1* | 8/2002 | Steibel et al. ............ 219/121.71 |
| 6,539,627 B2 | 4/2003 | Fleck |
| 6,561,758 B2 | 5/2003 | Rinck et al. |
| 6,630,645 B2* | 10/2003 | Richter et al. ............ 219/121.71 |
| 6,901,661 B2 | 6/2005 | Jonsson et al. |
| 6,914,214 B2 | 7/2005 | Byrd et al. |
| 6,984,100 B2* | 1/2006 | Bunker et al. ................. 415/115 |
| 7,204,019 B2 | 4/2007 | Ducotey, Jr. et al. |
| 7,216,485 B2 | 5/2007 | Caldwell et al. |
| 7,328,580 B2* | 2/2008 | Lee et al. ......................... 60/752 |
| 2002/0182074 A1 | 12/2002 | Bunker |
| 2004/0077293 A1 | 4/2004 | Kostar et al. |
| 2005/0173388 A1 | 8/2005 | Lavers et al. |
| 2006/0171809 A1 | 8/2006 | Albrecht et al. |
| 2006/0263222 A1 | 11/2006 | Vetters |
| 2007/0258811 A1 | 11/2007 | Shi et al. |
| 2008/0060197 A1 | 3/2008 | Lee |
| 2008/0095622 A1 | 4/2008 | Naik et al. |
| 2008/0145235 A1 | 6/2008 | Cunha et al. |
| 2008/0279678 A1 | 11/2008 | Merrill et al. |

OTHER PUBLICATIONS

Jahanmir (NPL "Machining of Ceramics and Composites"), pp. 640-642, published in 1999.*

Liu (NPL "Micro Electrical Discharge Machining of Si3N4-based Ceramic Composites"), published in 2008.*

International Search Report and Written Opinion, PCT/US10/62371, Rolls-Royce North American Technologies, Inc., dated Mar. 29, 2011.

European Office Action, dated Aug. 1, 2017, pp. 1-5, EP Patent Application No. 10 841 681.9, European Patent Office, Rijswijk, Netherlands.

Canadian Office Action, dated Oct. 16, 2017, pp. 1-5, CA Patent Application No. 2,785,974, Canadian Intellectual Property Office, Ottawa, Ontario.

Dannon Omar, "Non-traditional Machining Process," dated Aug. 21, 2014, pp. 1-22, SlideServe, Published at https://www.slideserve.com/dannon/non-traditional-machining-processes.

* cited by examiner

COMPOSITE GAS TURBINE ENGINE COMPONENT

CROSS REFERENCE TO RELATED APPLICATIONS

The present application claims the benefit of U.S. Provisional Patent Application 61/290,698, filed Dec. 29, 2009, and is incorporated herein by reference.

FIELD OF THE INVENTION

The present invention relates to gas turbine engines, and more particularly, to composite gas turbine engine components.

BACKGROUND

Composite gas turbine engine components remain an area of interest. Some existing systems have various shortcomings, drawbacks, and disadvantages relative to certain applications. Accordingly, there remains a need for further contributions in this area of technology.

SUMMARY

One embodiment of the present invention is a unique composite gas turbine engine component. In one form, the composite component is an airfoil. Another embodiment is a unique method for manufacturing a composite gas turbine engine component. Other embodiments include apparatuses, systems, devices, hardware, methods, and combinations composite gas turbine engine components. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
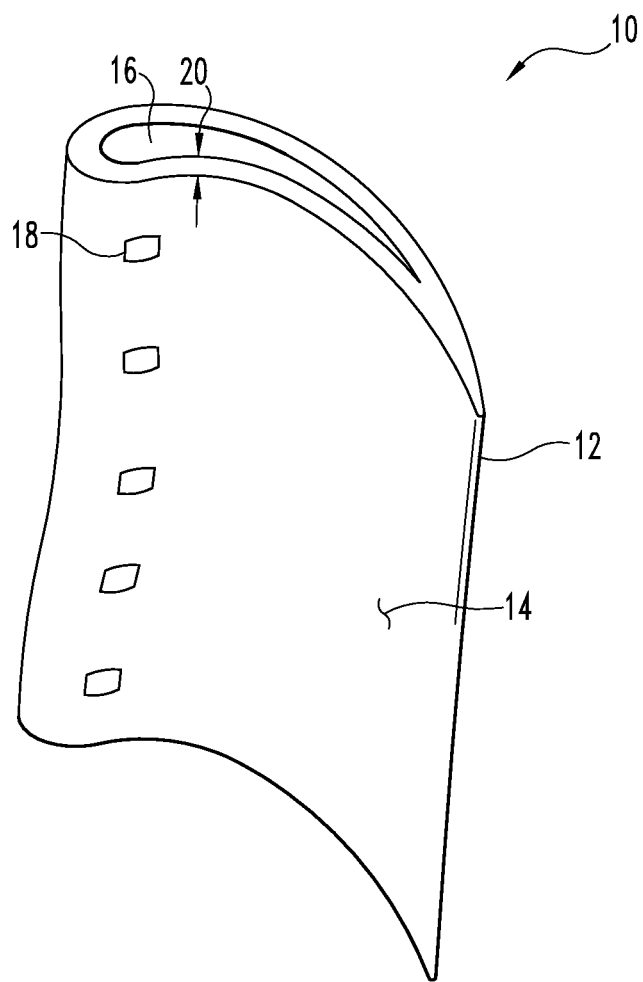
FIG. 1 illustrates a composite gas turbine engine component in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular FIG. 1, there is schematically illustrated a non-limiting example of a composite component 10 in accordance with an embodiment of the present invention. In one form, composite component 10 is a composite gas turbine engine component. As a composite component, gas turbine engine component 10 is formed of a composite material. In one form, the composite material is a ceramic matrix composite (CMC). In one form, the CMC material contains one or more of silicon carbide, transition metal carbide, carbon and/or oxide fibers with any combination of silicon carbide, transition metal carbide, carbon, boron carbide, aluminum oxide and/or any other ceramic, transition metal, and transition metal intermetallic. In other embodiments, other composite materials may be employed in addition to or in place of CMC, including metal matrix composites (MMC), organic matrix composites (OMC) and carbon-carbon composites.

In one form, gas turbine engine component 10 is a hot gas flowpath component of a gas turbine engine, that is, a gas turbine engine component that is directly exposed to the primary hot gas flowpath of a gas turbine engine. In other embodiments, component 10 may be a gas turbine engine component other than a hot gas flowpath component and/or may be any flowpath component. In one form, component 10 is disposed at least partially in the hot gas flowpath. In a particular form, gas turbine engine component 10 is an airfoil, such as a blade or a vane airfoil. Gas turbine engine component 10 may also be a blade platform or a vane shroud or the like, which may or may not be integral with an airfoil. In some embodiments, component 10 may bound the hot gas flowpath, i.e., defines at least a portion of a boundary or wall of the hot gas flowpath. It is alternatively considered that component 10 may be any composite gas turbine engine component.

In one form, composite gas turbine engine component 10 includes a composite structure 12 having a surface 14, a cavity 16 and a plurality of openings 18. Component 10 may include other features not shown in FIG. 1 or described herein, or may include less features than shown in FIG. 1 or described herein. In one form, surface 14 is a flowpath surface of component 10 and operable in the hot gas flowpath of the gas turbine engine. In a particular form, surface 14 is operable in the hot gas flowpath of a gas turbine engine during operation of the engine. As such, surface 14 is exposed to the hot gases passing through the flowpath. In other embodiments, surface 14 may be any surface of a composite gas turbine engine component that may or may not include a cavity such as cavity 16.

Cavity 16 is spaced apart from flowpath surface 14 by a wall thickness 20 of the composite material that forms component 10. Thickness 20 may vary with location on component 10 or may be constant. In the depiction of FIG. 1, cavity 16 is illustrated as a single cavity inside component 10. It will be understood that the present invention contemplates components having any number of cavities or no cavities.

Openings 18 extend into surface 14 of composite component 10. In one form, openings 18 are cooling air holes for supplying cooling air from cavity 16 to flowpath surface 14, and extend through thickness 20 to cavity 16. In the form of cooling holes, openings 18 are operable to discharge cooling air from cavity 16 to surface 14 and into the hot gas flowpath. In other embodiments, openings 18 may be other types of openings, e.g., recesses for receiving a mating part or for positioning component 10 relative to another part of the engine, and may or may not extend through thickness 20 to cavity 16 (FIG. 1). The number, shape and location of openings 18 may vary with the needs of the particular application.

Figure 2A:
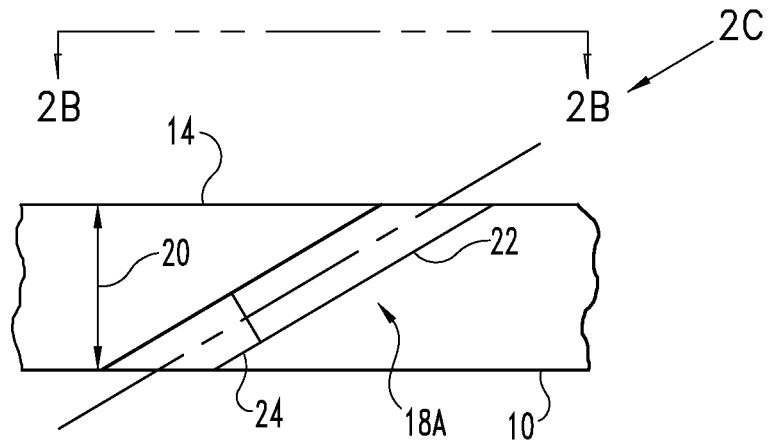
FIGS. 2A-2C depict an example of openings in a composite component in accordance with an embodiment of the present invention.
Figure 2B:
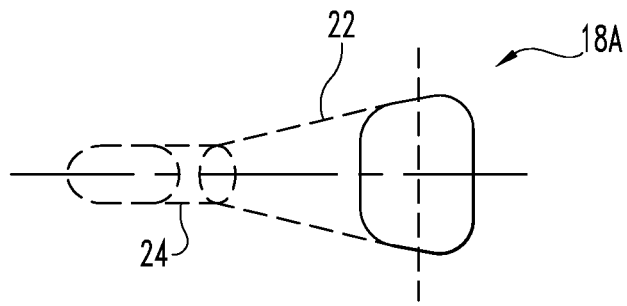
Figure 2C:
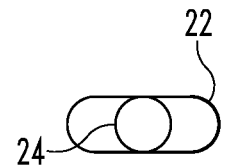

Referring now to FIGS. 2A-2C, a non-limiting example of an opening 18 in accordance with an embodiment of the present invention is depicted, and is identified as opening 18A. Opening 18A includes a geometric shape 22 extending from surface 14 through at least part of the composite material that defines component 10, e.g., toward cavity 16. In one form, a hole 24 extends between geometric shape 22 and cavity 16. In one form, hole 24 is cylindrical in shape. In other embodiments, hole 24 may have any other shape suited to the particular application. In one form, geometric shape 22 extends to cavity 16, e.g., wherein hole 24 may be considered a part of geometric shape 22. In another form, hole 24 may be considered a part of cavity 16 or otherwise a separately formed feature, e.g., formed separately from geometric shape 22. Geometric shape 22 may take a variety of forms. In one form, geometric shape 22 is noncylindrical. In one form, geometric shape 22 forms a diffuser, e.g., for diffusing cooling air received via cavity 16. In a particular form, geometric shape 22 is fan shaped, e.g., as depicted in FIGS. 2A-2C. In other embodiments, geometric shape 22 may have another shapes suited to the application. In one form, geometric shape 22 is formed ultrasonically, i.e., via an ultrasonic machining (USM) process. In another form, geometric shape 22 is formed by an electrical discharge machining (EDM) process. In other embodiments, other processes may be used to manufacture geometric shape 22.

Figure 3B:
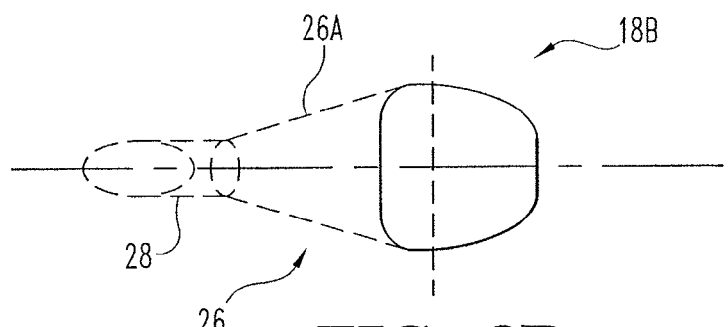
FIGS. 3A-3C depict an example of openings in a composite component in accordance with an embodiment of the present invention.
Figure 3C:
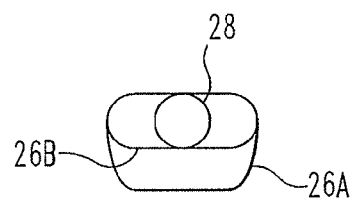
Figure 3A:
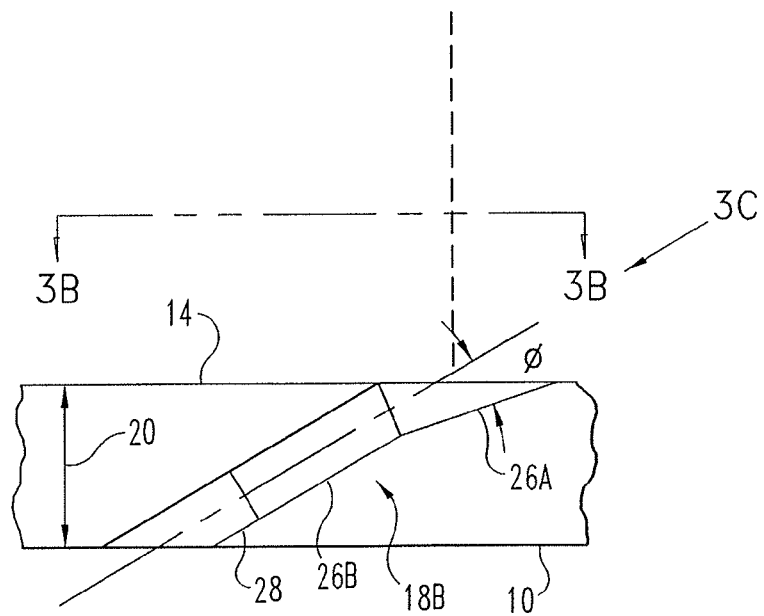

Referring now to FIGS. 3A-3C, another non-limiting example of an opening 18 in accordance with an embodiment of the present invention is depicted, and is identified as opening 18B. Opening 18B includes a geometric shape 26 extending from surface 14 through at least part of the composite material that defines component 10, e.g., toward cavity 16. In one form, geometric shape 26 includes a portion 26A and a portion 26B extending from portion 26A. In one form, a hole 28 extends between geometric shape 26 and cavity 16. In one form, hole 28 is cylindrical in shape. In other embodiments, hole 28 may have any other shape suited to the particular application. In one form, geometric shape 26 extends to cavity 16, e.g., wherein hole 28 is considered a part of geometric shape 26. In another form, hole 28 may be considered a part of cavity 16 or otherwise a separately formed feature, e.g., formed separately from geometric shape 26.

Geometric shape 26 may take a variety of forms. In one form, geometric shape 26 is noncylindrical. In one form, geometric shape 26 forms a diffuser, e.g., for diffusing cooling air received via cavity 16. In a particular form, geometric shape 26 is laid-back fan shaped, e.g., as depicted in FIGS. 3A-3C, wherein a fan shaped portion 26B is laid back at an angle $\varphi$ relative to the centerline of a fan shaped portion 26A. In other embodiments, geometric shape 26 may have another shapes suited to the application. In one form, geometric shape 26 is formed ultrasonically, i.e., via a USM process. In another form, geometric shape 26 is formed by an EDM process. In other embodiments, other processes may be used to manufacture geometric shape 26.

In one form, component 10 is manufactured by forming a composite structure having surface 14. The composite structure may also include cavity 16 spaced apart from the flowpath surface by thickness 20 of the composite material. The composite structure may be formed from one or more composite materials, e.g., those set forth herein, using conventional composite processing techniques. Once the composite structure is thus formed, openings 18 are formed by removing composite material from surface 14 to form one or more geometric shape, e.g., such as geometric shape 22 and/or 26 and/or other three-dimensional geometric shapes, which extend from the surface 14, e.g., toward cavity 16 in embodiments where a cavity 16 is present. In other embodiments, composite material may be removed from cavity 16 to form a geometric shape extending toward surface 14.

Figure 4:
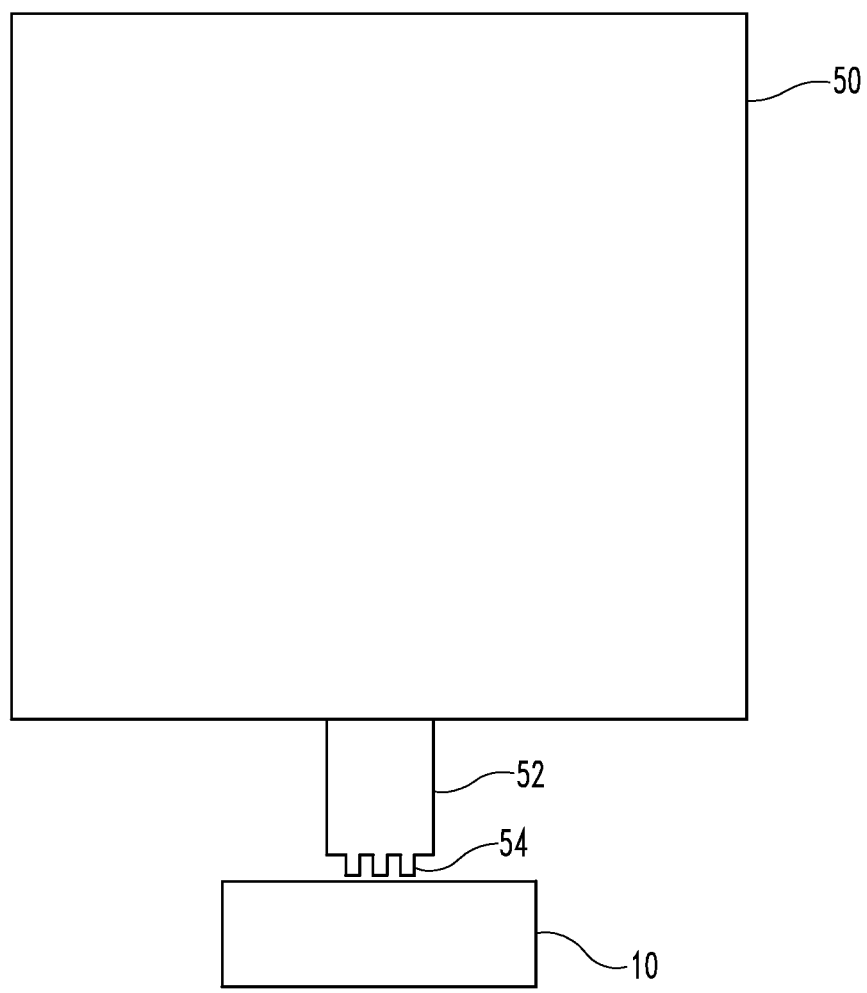
FIG. 4 schematically depicts a system for forming openings in a composite gas turbine engine component.

Referring now to FIG. 4, a non-limiting example of a system 50 for forming openings 18 is described. System 50 includes a cutting tool 52, such as a USM probe or an EDM probe. Cutting tool 52 includes one or more protrusions 54 that form one or more openings 18. In particular, protrusions 54 have a shape correspond to the geometric shapes of openings 18, such as geometric shapes 22, 26. In one form, a plurality of protrusions 54 are used to simultaneously form a plurality of geometric shapes. In another form a single protrusion 54 is used to form one geometric shape at a time.

In the form of an EDM system, system 50 electro-discharge machines the geometric shapes using cutting tool 52 with protrusions 54. In the form of a USM system, system 50 ultrasonically machines the geometric shapes using cutting tool 52 with protrusions 54. USM processing of openings 18 may be performed without masking surface 14, which may be required for some other types of material removal processing. For example, some other processing techniques require the use of masking to protect surface 14 from the material removal processing and/or environment, e.g., where surface 14 has a coating, such as an environmental barrier coating, or is otherwise susceptible to chemical and/or physical damage. System 50 forms the geometric shapes with requiring the use of back-strike protection, which is required for some processing techniques, e.g., laser cutting or machining systems.

Embodiments of the present invention include a composite gas turbine engine component, comprising: a composite structure having a flowpath surface operable in a hot gas flowpath of a gas turbine engine; a cavity spaced apart from the flowpath surface by a thickness of a composite material; and a cooling hole operative to discharge cooling air into the flowpath, wherein the cooling hole extends between the flowpath surface and the cavity, wherein the cooling hole includes an ultrasonically formed geometric shape extending from the flowpath surface through at least part of the composite material toward the cavity of the composite gas turbine engine component; and wherein the composite gas turbine engine component is disposed at least partially in the flowpath and/or bounds the flowpath.

In a refinement, the ultrasonically formed geometric shape is noncylindrical.

In another refinement, the ultrasonically formed geometric shape forms a diffuser for the cooling air.

In yet another refinement, the ultrasonically formed geometric shape is fan shaped.

In still another refinement, the ultrasonically formed geometric shape is laid-back fan shaped.

In yet still another refinement, the composite gas turbine engine component is an airfoil.

In a further refinement, the composite material is a ceramic matrix composite (CMC).

Embodiments of the present invention include a method for manufacturing a composite gas turbine engine component, comprising: forming a composite structure that is operable in a gas turbine engine, the composite structure being defined by a composite material and having a surface; and machining a geometric shape into the surface and through at least part of the composite material using at least one of an ultrasonic machining process and an electrical discharge machining process.

In a refinement, the machined geometric shape is fan shaped.

In another refinement, the machined geometric shape is laid-back fan shaped.

In yet another refinement, the composite gas turbine engine component is an airfoil.

In still another refinement, the composite material is a ceramic matrix composite (CMC).

Embodiments of the present invention include a method for manufacturing a composite airfoil, comprising: forming a composite airfoil structure having a flowpath surface and a cavity spaced apart from the flowpath surface by a thickness of a composite material; and a step for forming a geometric shape extending from the flowpath surface through at least part of the composite material toward the cavity of the composite airfoil.

In a refinement, the step for forming the geometric shape includes ultrasonically machining the geometric shape in the composite airfoil.

In another refinement, the step for forming includes using an ultrasonic probe that has a shape corresponding to the geometric shape.

In yet another refinement, the step for forming the geometric shape includes electrical discharge machining the geometric shape in the composite airfoil.

In still another refinement, the geometric shape forms at least part of a cooling hole for the composite airfoil.

In yet still another refinement, the step for forming the geometric shape includes using a probe to simultaneously form a plurality of the geometric shapes in the flowpath surface, wherein the probe has a plurality of protrusions each having a shape corresponding to the geometric shape.

In a further refinement, the flowpath surface has an environmental barrier coating; and wherein the step for forming the geometric shape is performed without using a masking material for protecting the environmental barrier coating.

In a yet further refinement, the step for forming the geometric shape is performed without using a back-strike protection.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine component, comprising:
   a structure formed of a composite material, the structure including:
      a flowpath surface operable in a hot gas flowpath of a gas turbine engine;
      a cavity spaced apart from the flowpath surface by a thickness of the composite material; and
      a cooling opening operative to discharge cooling air into the flowpath,
      wherein the cooling opening extends through the structure from the flowpath surface to the cavity, the cooling opening being defined by a plurality of ultrasonically formed geometric shapes; and
      wherein the composite gas turbine engine component is disposed at least partially in the flowpath and/or bounds the flowpath;
      wherein the composite material is a ceramic matrix composite (CMC), a metal matrix composite (MMC), and/or a carbon-carbon composite.

2. The gas turbine engine component of claim 1, wherein one of the ultrasonically formed geometric shapes is non-cylindrical.

3. The gas turbine engine component of claim 2, wherein one of the ultrasonically formed geometric shapes forms a diffuser for the cooling air.

4. The gas turbine engine component of claim 3, wherein one of the ultrasonically formed geometric shapes is fan shaped.

5. The gas turbine engine component of claim 3, wherein one of the ultrasonically formed geometric shapes is laid-back fan shaped.

6. The gas turbine engine component of claim 1, wherein the composite gas turbine engine component is an airfoil.

7. The gas turbine engine component of claim 1, wherein the composite material is a ceramic matrix composite (CMC).

8. A method for manufacturing a composite gas turbine engine component, comprising:
   forming a composite structure that is operable in a gas turbine engine, the composite structure being defined by a composite material and having a surface and a cavity spaced apart from the surface, wherein the composite material is a ceramic matrix composite (CMC), a metal matrix composite (MMC), and/or a carbon-carbon composite; and
   ultrasonic machining an opening into the surface and through the composite material from the surface to the cavity; and
   wherein the opening is defined by a plurality of geometric shapes
   wherein the step for ultrasonic machining the opening includes using a probe to simultaneously form a plurality of said openings in the composite structure, wherein the probe comprises a plurality of protrusions, each protrusion having a shape corresponding to the plurality of geometric shapes.

9. The method of claim 8, wherein one of the machined geometric shapes is fan shaped.

10. The method of claim 8, wherein one of the machined geometric shapes is laid-back fan shaped.

11. The method of claim 8, wherein the composite gas turbine engine component is an airfoil.

12. The method of claim 8, wherein the composite material is a ceramic matrix composite (CMC).

13. A method for manufacturing a composite airfoil, comprising:

forming a composite airfoil structure having a flowpath surface and a cavity spaced apart from the flowpath surface by a thickness of a composite material, wherein the composite material is a ceramic matrix composite (CMC), a metal matrix composite (MMC), and/or a carbon-carbon composite; and a step for forming a cooling opening having a plurality of geometric shapes, the cooling opening extending from the flowpath surface through the composite material to the cavity of the composite airfoil;

wherein the step for forming the cooling opening includes forming the plurality of geometric shapes in the composite airfoil by ultrasonic machining;

wherein the step for forming is performed without the use of backstrike protection; and wherein the step for forming the cooling opening includes using a probe to simultaneously form a plurality of said cooling openings in the composite airfoil structure, wherein the probe comprises a plurality of protrusions, each protrusion having a shape corresponding to the plurality of geometric shapes.

14. The method of claim 13, wherein the step for forming includes using an ultrasonic probe that has a shape corresponding to the plurality of geometric shapes.

15. The method of claim 13, wherein the flowpath surface has an environmental barrier coating; and wherein the step for forming the cooling opening is performed without using a masking material for protecting the environmental barrier coating.

* * * * *